US012074393B2

(12) United States Patent
Huang et al.

(10) Patent No.: US 12,074,393 B2
(45) Date of Patent: Aug. 27, 2024

(54) ELECTRICAL CONNECTOR WITH STOP FUNCTION

(71) Applicant: DONGGUAN LUXSHARE TECHNOLOGIES CO., LTD, Dongguan (CN)

(72) Inventors: Bin Huang, Dongguan (CN); Rongzhe Guo, Dongguan (CN)

(73) Assignee: DONGGUAN LUXSHARE TECHNOLOGIES CO., LTD, Dongguan (CN)

(*) Notice: Subject to any disclaimer, the term of this patent is extended or adjusted under 35 U.S.C. 154(b) by 402 days.

(21) Appl. No.: 17/579,091

(22) Filed: Jan. 19, 2022

(65) Prior Publication Data

US 2022/0416466 A1 Dec. 29, 2022

(30) Foreign Application Priority Data

Jun. 28, 2021 (CN) ......................... 202110717571.7

(51) Int. Cl.

| | |
|---|---|
| ***H01R 13/00*** | (2006.01) |
| ***H01R 13/502*** | (2006.01) |
| *H01R 13/115* | (2006.01) |
| *H01R 13/659* | (2011.01) |
| *H01R 25/00* | (2006.01) |

(52) U.S. Cl.

CPC .......... *H01R 13/502* (2013.01); *H01R 13/115* (2013.01); *H01R 13/659* (2013.01); *H01R 25/006* (2013.01)

(58) Field of Classification Search

CPC .. H01R 13/502; H01R 13/115; H01R 13/659; H01R 25/006

See application file for complete search history.

(56) References Cited

U.S. PATENT DOCUMENTS 2,829,639 A * 4/1958 Shackelford ........... A61C 11/00 602/17
5,194,016 A * 3/1993 Hatagishi ............. H01R 13/641 439/354
5,653,613 A * 8/1997 Shimoda ............ H01R 13/4361 439/752

(Continued)

FOREIGN PATENT DOCUMENTS

CN 101656363 A 2/2010
CN 201994447 U 9/2011

(Continued)

*Primary Examiner* — Phuong Chi Thi Nguyen

(74) *Attorney, Agent, or Firm* — Birch, Stewart, Kolasch & Birch, LLP

(57) ABSTRACT

An electrical connector includes an insulating body, a number of first conductive terminals and a metal shell. The insulating body includes a first butting protrusion having a first slot. The metal shell is assembled to the insulating body along an assembling direction. The metal shell includes a top wall, a bottom wall, two side walls and a partition wall. The metal shell includes a first receiving cavity for receiving a first mating plug. The metal shell further includes an installation opening extending downwardly to receive the insulating body. The electrical connector includes a first stop portion provided on the first mating protrusion and adapted for stopping further insertion of the first mating plug.

20 Claims, 11 Drawing Sheets

(56) References Cited

U.S. PATENT DOCUMENTS

| | | | | |
|---|---|---|---|---|
| 5,928,034 | A * | 7/1999 | Tabata | H01R 13/4365 439/752.5 |
| 2017/0207590 | A1* | 7/2017 | Dombrowski | H01R 24/84 |
| 2018/0331438 | A1* | 11/2018 | Moser | H01R 9/2416 |
| 2019/0280420 | A1 | 9/2019 | Phillips et al. | |

FOREIGN PATENT DOCUMENTS

| | | | |
|---|---|---|---|
| CN | 202134670 | U | 2/2012 |
| CN | 102723841 | A | 10/2012 |
| CN | 203826603 | U | 9/2014 |
| CN | 204257893 | U | 4/2015 |
| CN | 104716510 | A | 6/2015 |
| CN | 208238892 | U | 6/2017 |
| CN | 107548518 | A | 1/2018 |
| CN | 107681301 | A | 2/2018 |
| CN | 107800007 | A | 3/2018 |
| CN | 110233377 | A | 9/2019 |
| CN | 111584721 | A | 8/2020 |
| CN | 211719825 | U | 10/2020 |
| CN | 111883982 | A | 11/2020 |
| TW | M408162 | U1 | 7/2011 |

* cited by examiner

ELECTRICAL CONNECTOR WITH STOP FUNCTION

CROSS-REFERENCE TO RELATED APPLICATION

This patent application claims priority of a Chinese Patent Application No. 202110717571.7, filed on Jun. 28, 2021 and titled "ELECTRIC CONNECTOR", the entire content of which is incorporated herein by reference.

TECHNICAL FIELD

The present disclosure relates to an electrical connector, which belongs to a technical field of connectors.

BACKGROUND

With the development of electrical connectors, especially high-speed connectors, stacked electrical connectors have become more and more common. A stacked electrical connector usually includes an upper port and a lower port. From a structural point of view, the stacked electrical connector includes an insulating body, a plurality of conductive terminals, and a metal shell enclosing the insulating body.

In some installation methods, after the insulating body and the conductive terminal are assembled, they are firstly mounted to a circuit board. Then, the metal shell is mounted on an outside of the insulating body along a top-to-bottom direction to be fixed to the circuit board. However, in this installation method, in order to avoid mutual interference between the metal shell and the insulating body during installation, those skilled in the art will not provide a stop structure to stop a mating plug in the lower port.

SUMMARY

An object of the present disclosure is to provide an electrical connector with stacked ports and a stop function in a lower port.

In order to achieve the above object, the present disclosure adopts the following technical solution: an electrical connector, including: an insulating body, the insulating body including a main body and a first mating protrusion extending from the main body, the first mating protrusion including a first mating surface and a first slot extending through the first mating surface; a plurality of first conductive terminals, each first conductive terminal including a first mating portion protruding into the first slot; a metal shell, the metal shell being assembled to the insulating body along an assembling direction, the metal shell including a top wall, a bottom wall, two side walls connecting the top wall and the bottom wall, and a partition wall located between the top wall and the bottom wall, the metal shell defining a first receiving cavity enclosed by the bottom wall, the partition wall and the two side walls, the first receiving cavity being adapted to receive a first mating plug; wherein the metal shell further includes an installation opening extending downwardly through the partition wall and the bottom wall, the insulating body is received in the metal shell through the installation opening, and the first mating protrusion communicates with the first receiving cavity; and wherein the electrical connector includes a first stop portion provided on the first mating protrusion and the first stop portion is adapted to stop the first mating plug.

In order to achieve the above object, the present disclosure adopts the following technical solution: a stacked electrical connector, including: an insulating body, the insulating body including a first mating protrusion and a second mating protrusion disposed above the first mating protrusion, the first mating protrusion including a first mating surface and a first slot extending through the first mating surface, the second mating protrusion including a second mating surface and a second slot extending through the second mating surface, the second mating protrusion being in parallel to the first mating protrusion; a plurality of first conductive terminals, each first conductive terminal including a first mating portion protruding into the first slot; a plurality of second conductive terminals, each second conductive terminal including a second mating portion protruding into the second slot; a metal shell, the metal shell being assembled to the insulating body along a horizontal direction, the metal shell including a top wall, a bottom wall, two side walls connecting the top wall and the bottom wall, and a partition wall located between the top wall and the bottom wall; the metal shell defining a first receiving cavity and a second receiving cavity; the first receiving cavity being at least enclosed by the bottom wall, the partition wall and the two side walls, the second receiving cavity being at least enclosed by the top wall, the partition wall and the two side walls; the first receiving cavity being adapted to receive a first mating plug, the second receiving cavity being adapted to receive a second mating plug; wherein the metal shell further includes an installation opening extending downwardly through the partition wall and the bottom wall, the insulating body is received in the metal shell through the installation opening along a vertical direction; wherein the electrical connector includes a first stop portion provided on the first mating protrusion, and the first stop portion is adapted to stop further insertion of the first mating plug along the horizontal direction; and wherein the metal shell includes a second stop portion protruding into the second receiving cavity, and the second stop portion is adapted to stop further insertion of the second mating plug along the horizontal direction.

Compared with the prior art, the present disclosure is provided with a port corresponding to the first mating protrusion, and the electrical connector includes a first stop portion for stopping the first mating plug, so that the port corresponding to the first mating protrusion has a stopping function.

DETAILED DESCRIPTION

Figure 1:
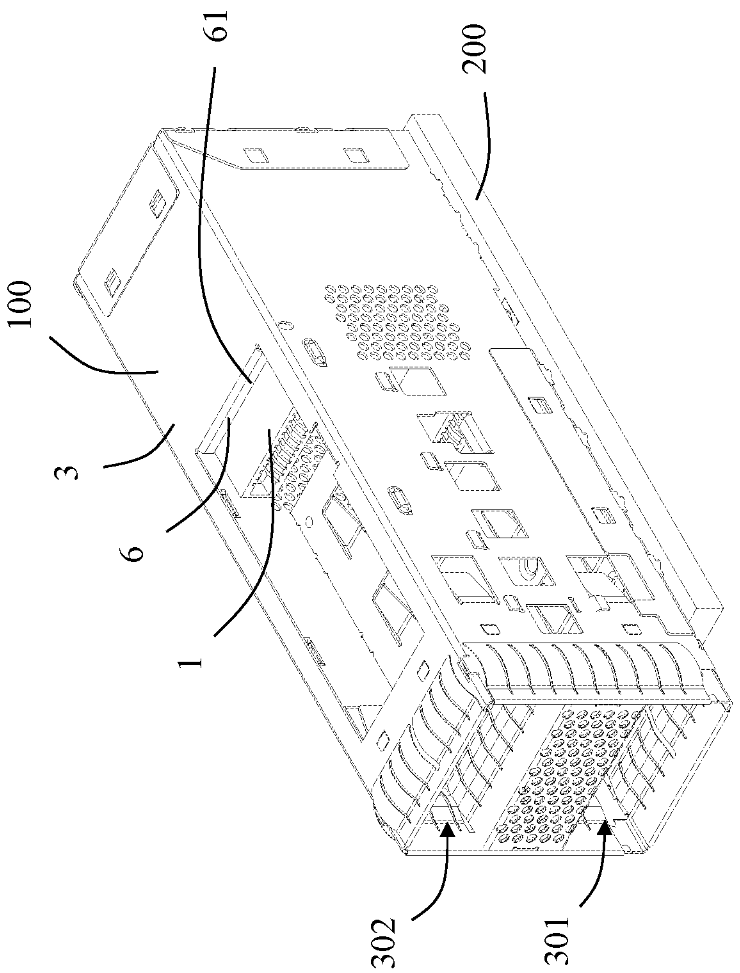
FIG. 1 is a perspective schematic view of an electrical connector mounted to a circuit board in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 11, the present disclosure discloses an electrical connector 100 for being mounted to a circuit board 200. The electrical connector 100 is adapted to mate with a mating plug so as to realize high-speed data transmission. In the illustrated embodiment of the present disclosure, the electrical connector 100 is an SFP (Small Form-factor Pluggable) receptacle connector, a QSFP (Quad Small Form-factor Pluggable) receptacle connector, or a QSFP-DD (Quad Small Form-factor Pluggable-Double Density) receptacle connector etc. The mating plug is an optical module plug.

Figure 3:
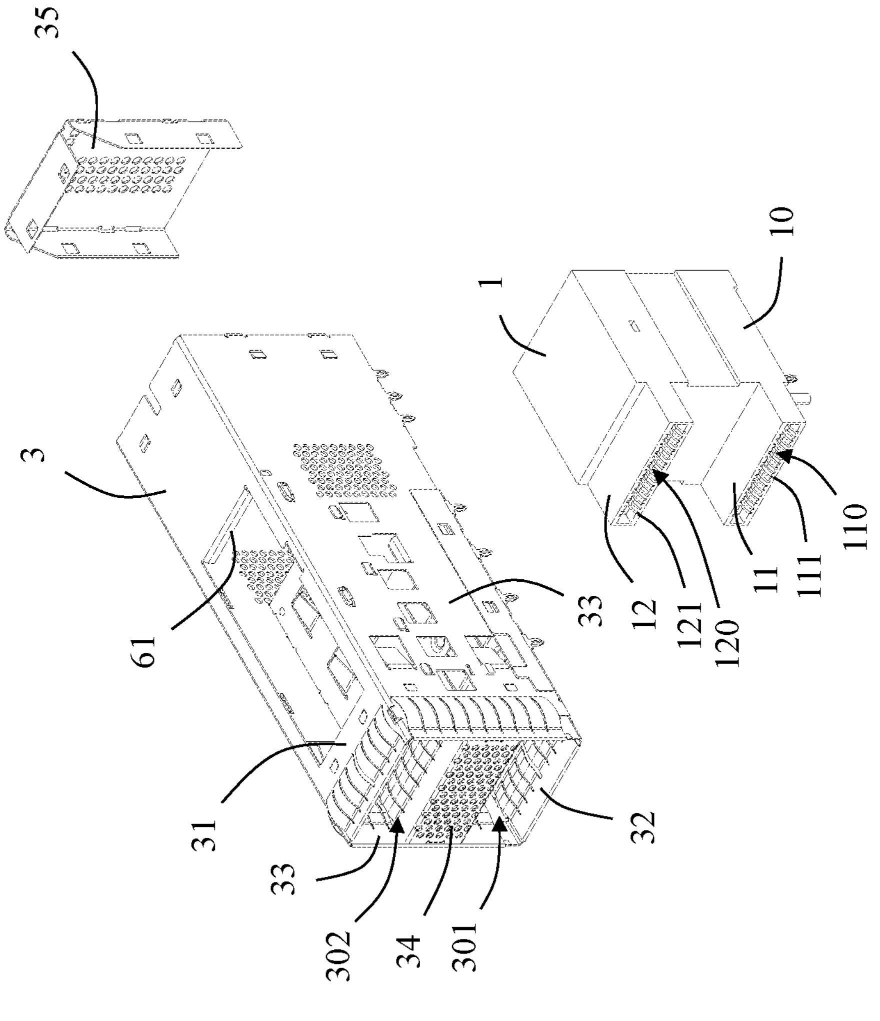
FIG. 3 is a partial perspective exploded view of the electrical connector in accordance with the embodiment of the present disclosure.
Figure 4:
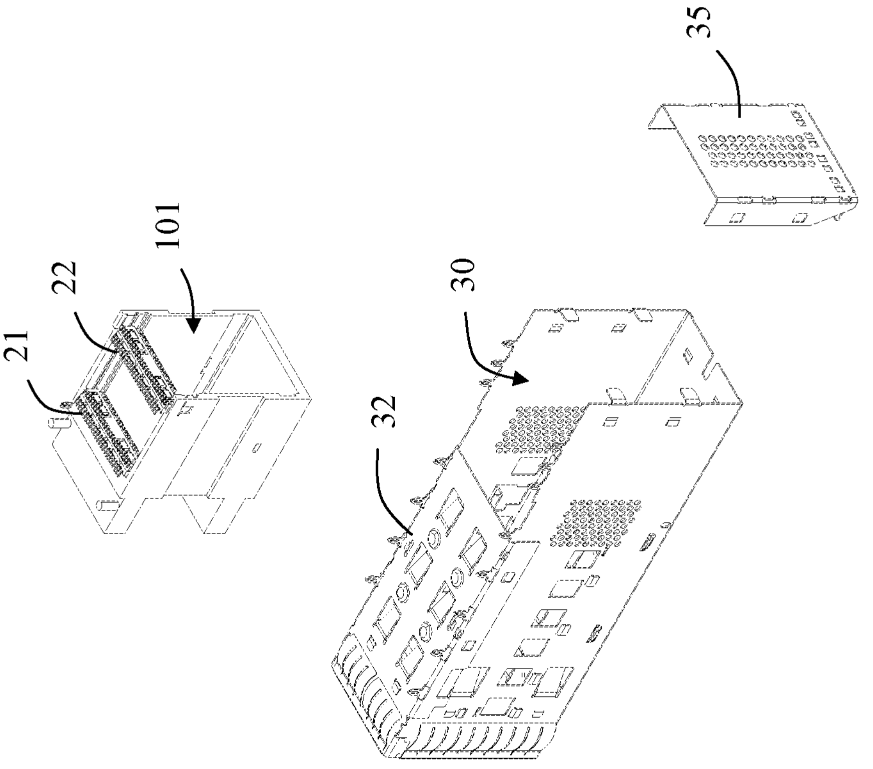
FIG. 4 is a partially exploded perspective view of FIG. 3 from another angle.

Referring to FIGS. 3 and 4, the electrical connector 100 includes an insulating body 1, a plurality of first conductive terminals 21 assembled to the insulating body 1, a plurality of second conductive terminals 22 assembled to the insulating body 1, and a metal shell 3 enclosing the insulating body 1. The insulating body 1 includes a main body 10, a first mating protrusion 11 extending horizontally and forwardly from the main body 10, and a second mating protrusion 12 extending horizontally and forwardly from the main body 10. In the illustrated embodiment of the present disclosure, the first mating protrusion 11 and the second mating protrusion 12 are parallel to each other. The first mating protrusion 11 is located under the second mating protrusion 12. The main body 10 includes an installation space 101 recessed forwardly from a rear end surface of the main body 10. The first mating protrusion 11 has a first mating surface 111 and a first slot 110 extending through the first mating surface 111. The second mating protrusion 12 has a second mating surface 121 and a second slot 120 extending through the second mating surface 121. Both the first slot 110 and the second slot 120 are in communication with the installation space 101.

Figure 5:
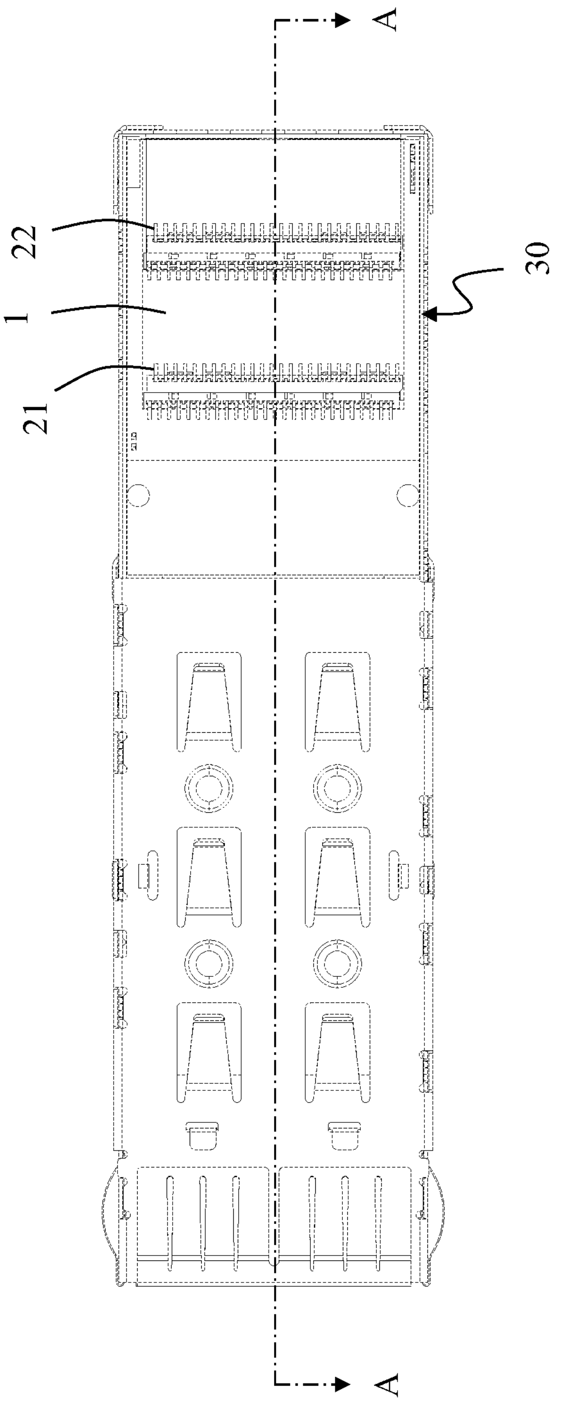
FIG. 5 is a bottom view of the electrical connector in accordance with the embodiment of the present disclosure.
Figure 6:
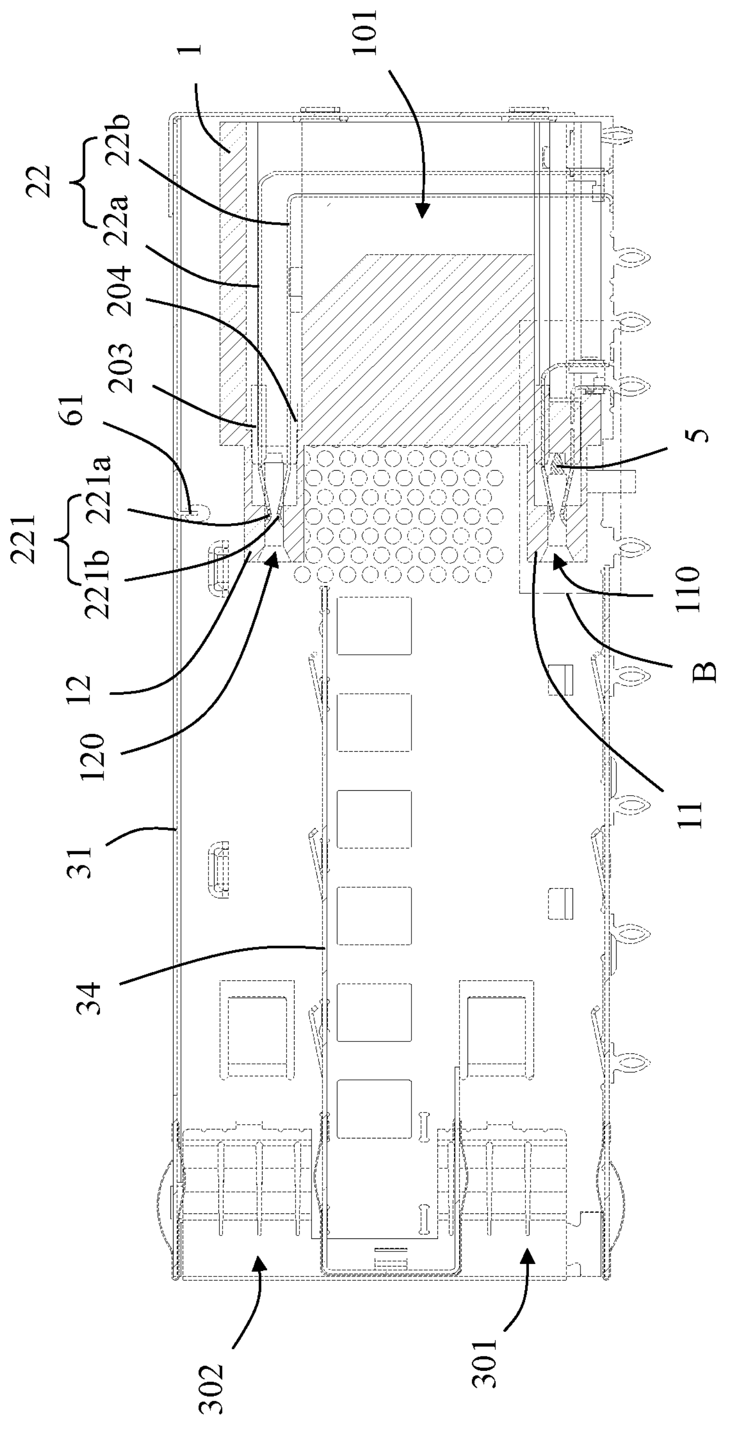
FIG. 6 is a schematic cross-sectional view taken along line A-A in FIG. 5.
Figure 7:
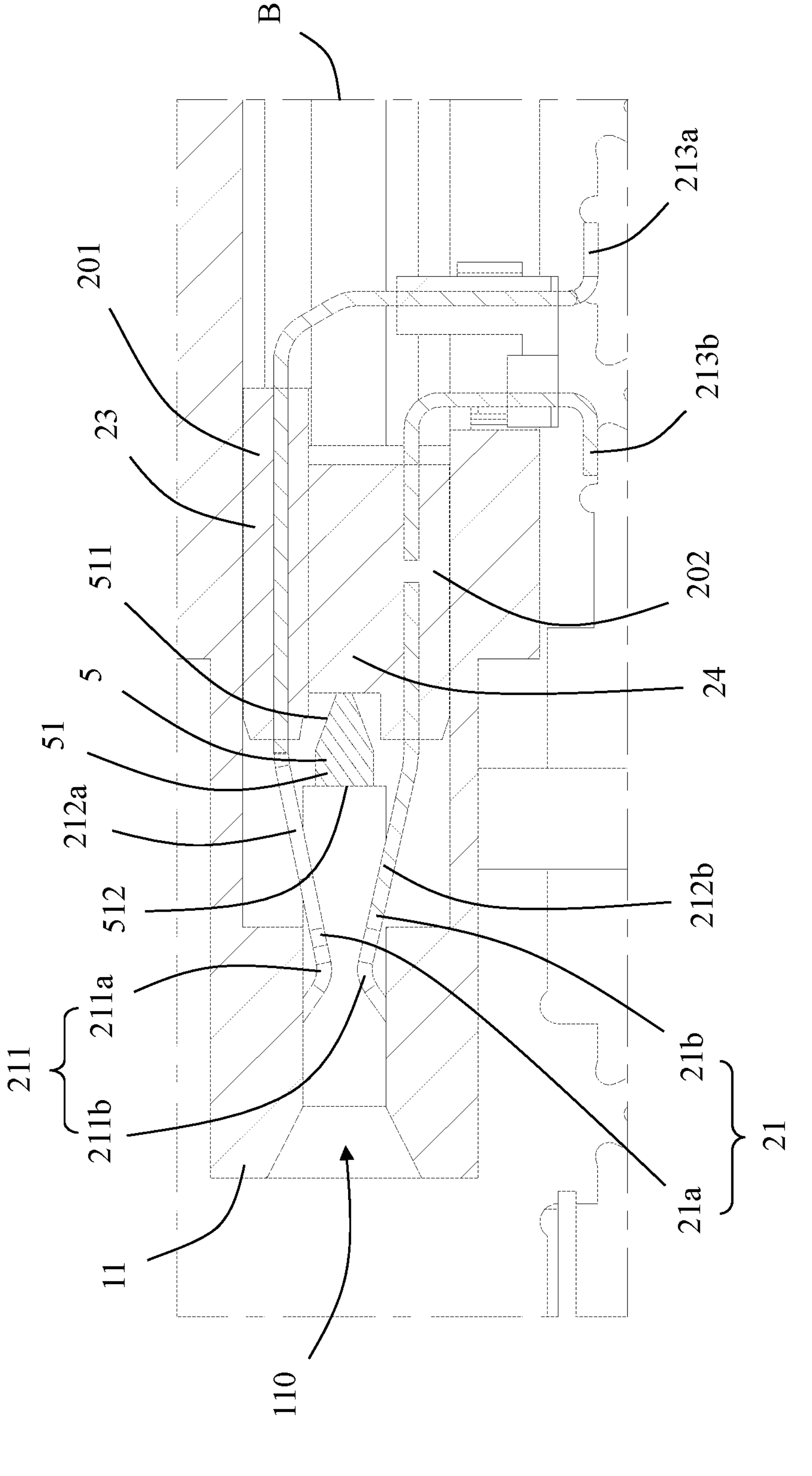
FIG. 7 is a partial enlarged view of a frame part B in FIG. 6.
Figure 8:
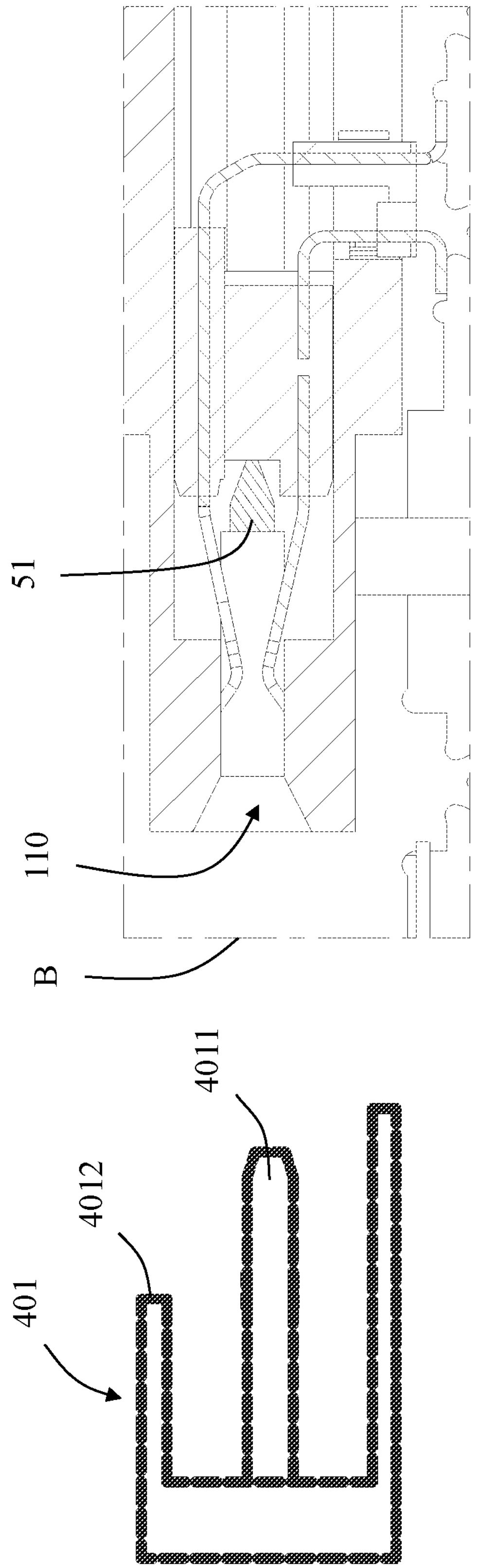
FIG. 8 is a schematic view of the frame part B in FIG. 7 before a first mating plug is inserted.
Figure 9:
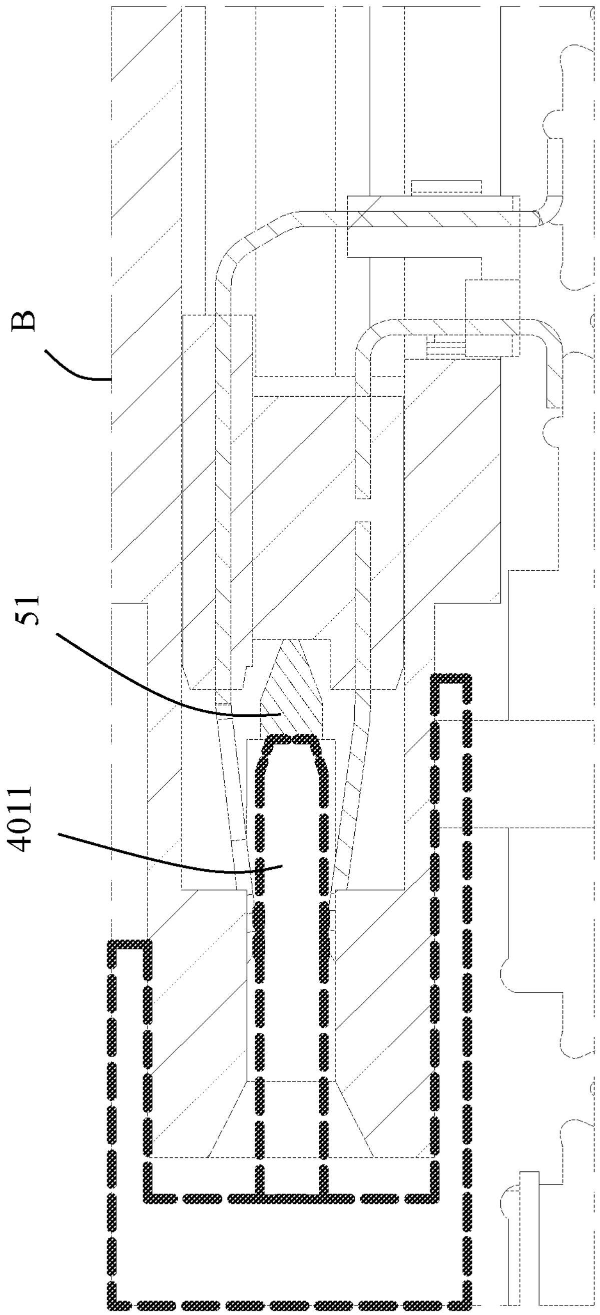
FIG. 9 is a schematic view of the frame part B in FIG. 7 after the first mating plug is inserted.

Referring to FIGS. 5 to 7, each first conductive terminal 21 includes a first mating portion 211 protruding into the first slot 110. Each second conductive terminal 22 includes a second mating portion 221 protruding into the second slot 120. In an embodiment of the present disclosure, the first conductive terminal 21 and the second conductive terminal 22 can be directly assembled to the insulating body 1. In the illustrated embodiment of the present disclosure, each of the first conductive terminal 21 and the second conductive terminal 22 is combined with an insulating block so as to form a terminal module, and then the terminal module as a whole is assembled to the insulating body 1, which will be described in detail later.

Specifically, in the illustrated embodiment of the present disclosure, the electrical connector 100 includes a first terminal module 201 and a second terminal module 202. The first conductive terminal 21 includes a plurality of upper first conductive terminals 21*a* and a plurality of lower first conductive terminals 21*b*. The first mating portion 211 includes an upper first mating portion 211*a* and a lower first mating portion 211*b*. The first terminal module 201 includes a first insulating block 23 and the upper first conductive terminals 21*a* fixed to the first insulating block 23. The second terminal module 202 includes a second insulating block 24 and the lower first conductive terminals 21*b* fixed to the second insulating block 24. In an embodiment of the present disclosure, the upper first conductive terminals 21*a* are insert-molded with the first insulating block 23. The lower first conductive terminals 21*b* are insert-molded with the second insulating block 24. Of course, in other embodiments, the upper first conductive terminals 21*a* can also be fixed to the first insulating block 23 by assembling. The lower first conductive terminals 21*b* can also be fixed to the second insulating block 24 by assembling. For better understanding, the first terminal module 201 and the second terminal module 202 are combined together to be referred to as a lower terminal module.

Specifically, each upper first conductive terminal 21*a* includes a first elastic arm 212*a* protruding into the first slot 110 and a first soldering portion 213*a* extending beyond the first insulating block 23. The upper first mating portion 211*a* is provided on the first elastic arm 212*a*. For example, the upper first mating portion 211*a* is located at a free end of the first elastic arm 212*a*. The first soldering portion 213*a* extends horizontally and backwardly, and is adapted for being soldered to the circuit board 200 by surface mount technology. Of course, in other embodiments, the first soldering portion 213*a* can also extend vertically and downwardly, and is adapted for being soldered to the circuit board 200 by through-hole technology.

Each lower first conductive terminal 21*b* includes a second elastic arm 212*b* protruding into the first slot 110 and a second soldering portion 213*b* extending beyond the second insulating block 24. The lower first mating portion 211*b* is provided on the second elastic arm 212*b*. For example, the lower first mating portion 211*b* is located at a free end of the second elastic arm 212*b*. The second soldering portion 213*b* extends horizontally and forwardly, and is adapted for being soldered to the circuit board 200 by surface mount technology. Of course, in other embodiments, the second soldering portion 213*b* may also extend vertically and downwardly, and is adapted for being soldered to the circuit board 200 by through-hole technology.

In the illustrated embodiment of the present disclosure, the first elastic arm 212*a* extends obliquely toward the second elastic arm 212*b*, and the second elastic arm 212*b* extends obliquely toward the first elastic arm 212*a*. The upper first mating portion 211*a* and the lower first mating portion 211*b* are located on an upper side and a lower side of the first slot 110, respectively. As a result, the upper first conductive terminals 21*a* and the lower first conductive terminals 21*b* can better clamp the mating plug, thereby improving the mating stability.

In the illustrated embodiment of the present disclosure, the first insulating block 23 and the second insulating block 24 are at least in contact with each other. Preferably, the first insulating block 23 and the second insulating block 24 are provided with locking features which are lockable with each other. Through the locking features (such as a protrusion and a groove mutually matched with each other), it can be realized that after the first terminal module 201 and the second terminal module 202 are assembled to form the lower terminal module, the lower terminal module can be combined into a whole. This design facilitates the overall installation of the lower terminal module in the installation space 101 of the insulating body 1, thereby improving the convenience of assembly.

Similarly, referring to FIG. 6, in the illustrated embodiment of the present disclosure, the electrical connector 100 includes a third terminal module 203 and a fourth terminal module 204. The second conductive terminals 22 include a plurality of upper second conductive terminals 22*a* and a plurality of lower second conductive terminals 22*b*. The second mating portions 221 of the second conductive terminals 22 include an upper second mating portion 221*a* and a lower second mating portion 221*b*. The third terminal module 203 and the fourth terminal module 204 are respectively similar to the first terminal module 201 and the second terminal module 202, which will not be repeated in the present disclosure in detail.

Figure 2:
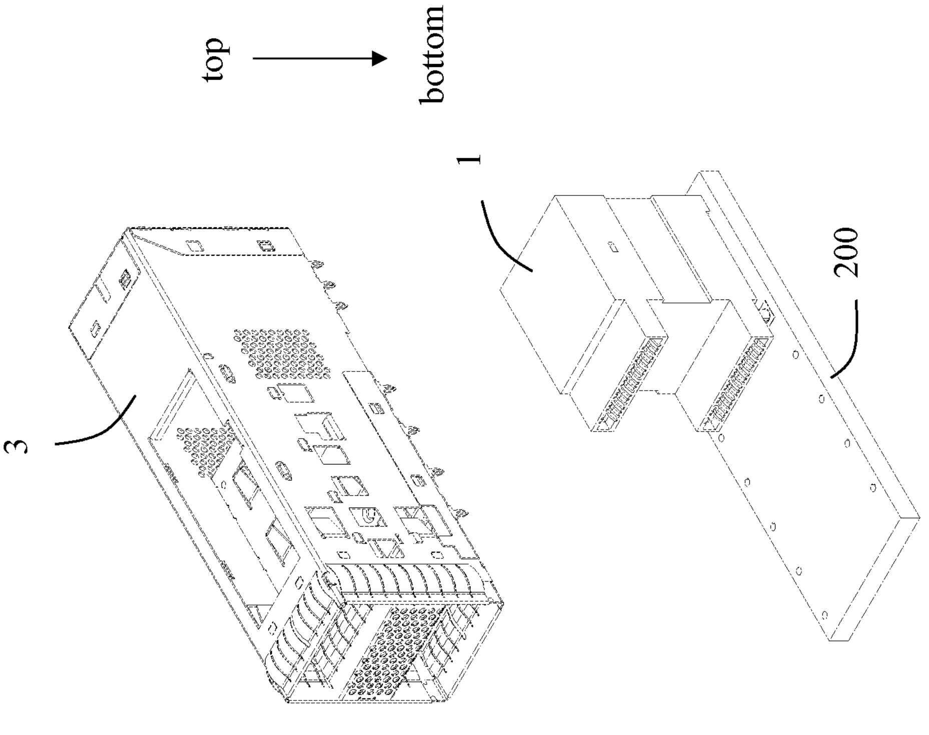
FIG. 2 is a partial perspective exploded view of FIG. 1, wherein conductive terminals are mounted to the circuit board, but a metal shell is separated from the circuit board.

As shown in FIG. 2, the metal shell 3 is assembled to the insulating body 1 along an assembling direction. In the illustrated embodiment of the present disclosure, the assembling direction is a top-to-bottom direction. Referring to FIGS. 1 to 4, the metal shell 3 includes a top wall 31, a bottom wall 32, two side walls 33 connecting the top wall 31 and the bottom wall 32, a partition wall 34 located between the top wall 31 and the bottom wall 32, and a rear wall 35 buckled with the top wall 31, the bottom wall 32 and the two side walls 33. The metal shell 3 includes a first receiving cavity 301 enclosed by the bottom wall 32, the partition wall 34 and lower half portions of the two side walls 33, and a second receiving cavity 302 enclosed by the top wall 31, the partition wall 34 and upper half portions of the two side walls 33. The first receiving cavity 301 is adapted for receiving a first mating plug 401. The second receiving cavity 302 is adapted for receiving a second mating plug (not shown, which is similar to the first mating plug 401). The first receiving cavity 301 extends forwardly through the metal shell 3 to form a lower port. The second receiving cavity 302 extends forwardly through the metal shell 3 to form an upper port.

The metal shell 3 further includes an installation opening 30 extending downwardly through the partition wall 34 and the bottom wall 32. The insulating body 1 is received in the metal shell 3 through the installation opening 30.

When assembling, the first conductive terminals 21 and the second conductive terminals 22 are directly assembled in the insulating body 1 or formed into terminal modules before being assembled in the insulating body 1. Then, the insulating body 1 is mounted to the circuit board 200. Finally, the metal shell 3 is mounted to the circuit board 200 along the top-to-bottom direction. In the process of installing the metal shell 3, the installation opening 30 corresponds to a position where the insulating body 1 is located. As the metal shell 3 moves downwardly, the insulating body 1 finally passes through the installation opening 30 and extends into the metal shell 3. After the metal shell 3 is installed in place, the first mating protrusion 11 is located at the rear end of the first receiving cavity 301 and communicates with the first receiving cavity 301. The second mating protrusion 12 is located at the rear end of the second receiving cavity 302 and communicates with the second receiving cavity 302. In other words, after the metal shell 3 is installed in place, the first mating protrusion 11 is exposed forwardly to the first receiving cavity 301; and the second mating protrusion 12 is exposed forwardly to the second receiving cavity 302. On one hand, the metal shell 3 forms an accommodating cavity for accommodating a part of the mating plug, and on the other hand, it can also play a better anti-interference effect on signal transmission.

Referring to FIGS. 6 to 11, in the illustrated embodiment of the present disclosure, the electrical connector 100 includes a first stop portion 5 for abutting against the first mating plug 401. By providing the first stop portion 5, on one hand, an insertion depth of the first mating plug 401 can be limited, thereby ensuring that the first mating portion 211 of the first mating plug 401 and the first conductive terminals 21 can achieve reliable contact; and on the other hand, it can also prevent the first mating plug 401 from being excessively inserted into the first receiving cavity 301 to avoid damage to the electrical connector 100.

Referring to FIGS. 6 to 9, in a first embodiment of the present disclosure, the first stop portion 5 is provided on the first mating protrusion 11. The first stop portion 5 includes a stop block 51 located at a rear end of the first slot 110 and exposed forwardly in the first slot 110. The stop block 51 is made separately from the insulating body 1. The stop block 51 is installed in the first slot 110. The stop block 51 includes an inclined guide portion 511 to facilitate insertion of the stop block 51 into the first slot 110. After the stop block 51 is inserted into the first slot 110, the stop block 51 is located between the first elastic arm 212*a* and the second elastic arm 212*b*. The stop block 51 abuts against the first insulating block 23 and/or the second insulating block 24. Referring to FIG. 7, in the illustrated embodiment of the present disclosure, the stop block 51 abuts against the second insulating block 24. The stop block 51 includes a stop surface 512 exposed forwardly in the first slot 110. The stop surface 512 is adapted to abut against the first tongue 4011 of the first mating plug 401 so as to stop further insertion of the first mating plug 401. In the illustrated embodiment of the present disclosure, the stop surface 512 is a vertical surface, so that the contact area between the stop surface 512 and the first tongue 4011 is relatively large, thereby improving reliability.

Figure 10:
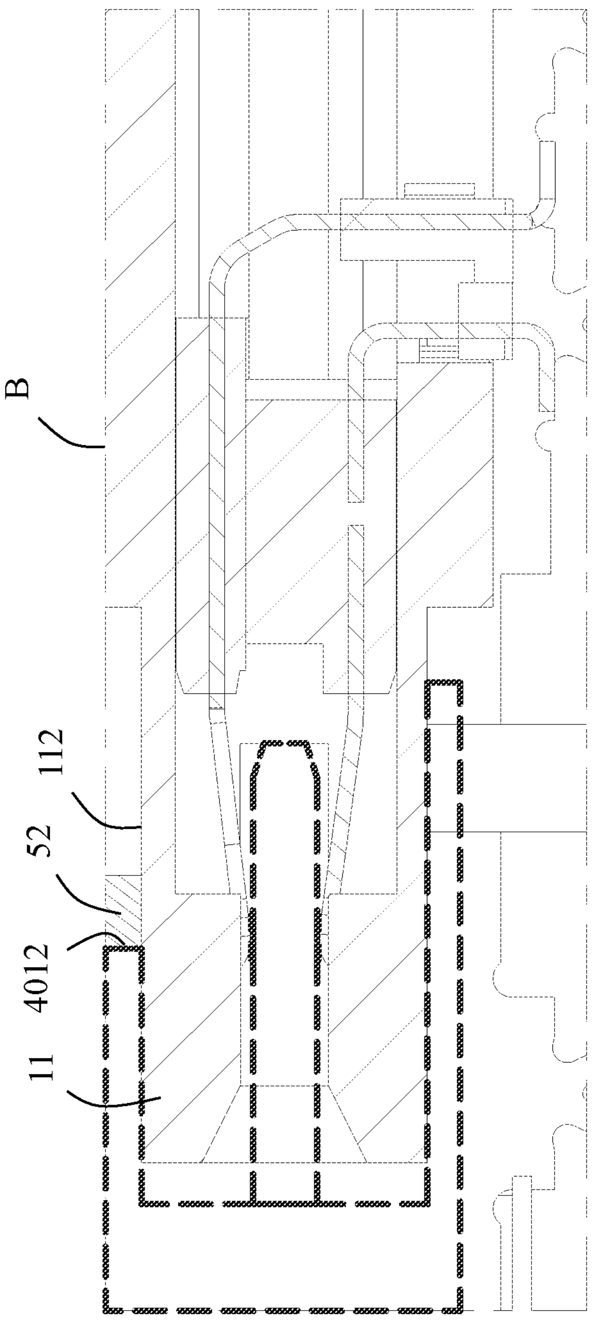
FIG. 10 is a schematic view of a second embodiment of FIG. 9.

In other embodiments of the present disclosure, the first stop portion 5 includes a stop protrusion 52 fixed to the first mating protrusion 11 and protruding into the first receiving cavity 301. Referring to FIG. 10, in a second embodiment of the present disclosure, the stop protrusion 52 and the first mating protrusion 11 are made separately, and the stop protrusion 52 is installed on the first mating protrusion 11. Preferably, the stop protrusion 52 is installed and fixed on an upper surface 112 of the first mating protrusion 11 so as to prevent the stop protrusion 52 from interfering with the installation of the metal shell 3. The stop protrusion 52 is adapted to abut against an outer shell 4012 of the first mating plug 401 so as to stop further insertion of the first mating plug 401.

Figure 11:
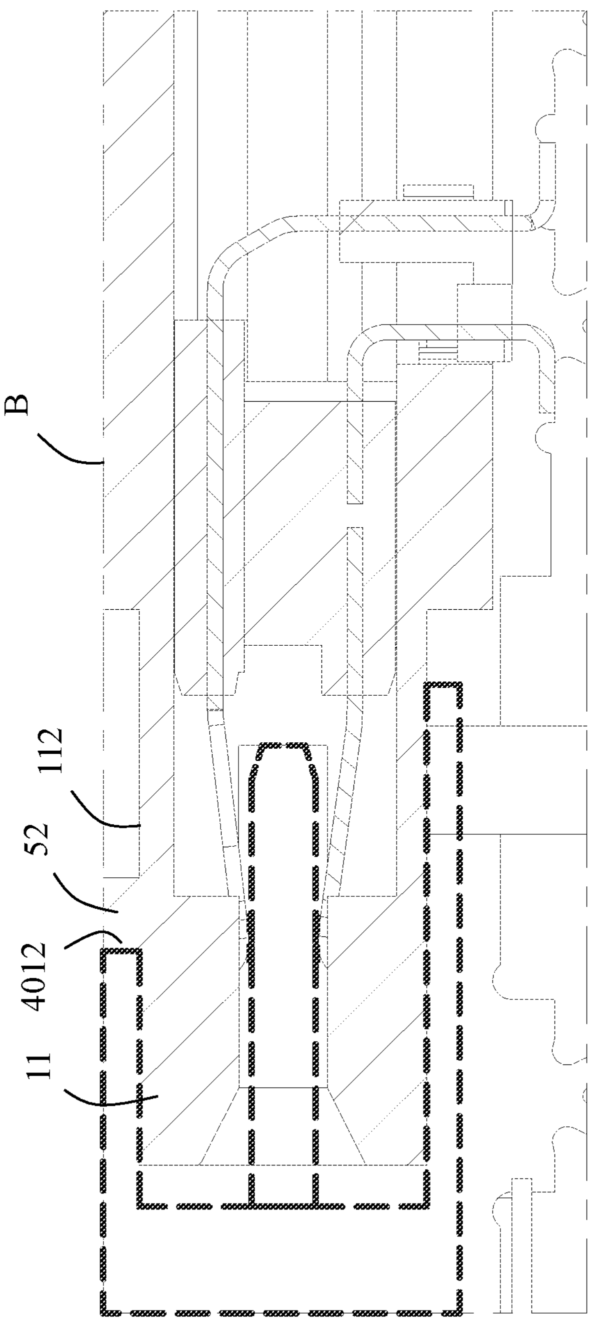
FIG. 11 is a schematic view of a third embodiment of FIG. 9.

Referring to FIG. 11, in a third embodiment of the present disclosure, the stop protrusion 52 and the first mating protrusion 11 are integrally formed to improve the structural strength and save cost. Preferably, the stop protrusion 52 is integrally formed on the upper surface 112 of the first mating protrusion 11 so as to prevent the stop protrusion 52 from interfering with the installation of the metal shell 3. The stop protrusion 52 is adapted to abut against the outer shell 4012 of the first mating plug 401 so as to stop further insertion of the first mating plug 401.

Referring to FIGS. 1 and 6, the metal shell 3 includes a second stop portion 6 protruding into the second receiving cavity 302 to stop the second mating plug. In the illustrated embodiment of the present disclosure, the second stop portion 6 includes a stop piece 61 integrally bent downwardly from the top wall 31. By providing the stop piece 61 on the top wall 31, it is possible to prevent the stop piece 61 and the insulating body 1 from being obstructed during the process of mounting the metal shell 3 to the circuit board 200. By providing the second stop portion 6, on one hand, an insertion depth of the second mating plug can be limited, thereby ensuring that the second mating plug can reliably contact the second mating portions 221 of the second conductive terminals 22; and on the other hand, it can also prevent the second mating plug from being excessively inserted into the second receiving cavity 302 to avoid damage to the electrical connector 100.

It is understandable to those skilled in the art that the shape of the first stop portion 5 and/or the second stop portion 6 is not limited to the embodiments shown in the present disclosure, and any shape that can serve as a stopper against the mating plug is feasible. In addition, the number of the first stop portion 5 and/or the second stop portion 6 is not limited to one, and can be set to several as required.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body, the insulating body comprising a main body and a first mating protrusion extending from the main body, the first mating protrusion comprising a first mating surface and a first slot extending through the first mating surface;

a plurality of first conductive terminals, each first conductive terminal comprising a first mating portion protruding into the first slot;

a metal shell, the metal shell being assembled to the insulating body along an assembling direction, the metal shell comprising a top wall, a bottom wall, two side walls connecting the top wall and the bottom wall, and a partition wall located between the top wall and the bottom wall, the metal shell defining a first receiving cavity enclosed by the bottom wall, the partition wall and the two side walls, the first receiving cavity being adapted to receive a first mating plug;

wherein the metal shell further comprises an installation opening extending downwardly through the partition wall and the bottom wall, the insulating body is received in the metal shell through the installation opening, and the first mating protrusion communicates with the first receiving cavity; and wherein the electrical connector comprises a first stop portion provided on the first mating protrusion and the first stop portion is adapted to stop further insertion of the first mating plug.

2. The electrical connector according to claim 1, wherein the insulating body further comprises a second mating protrusion disposed above the first mating protrusion, and the second mating protrusion comprises a second mating surface and a second slot extending through the second mating surface; and wherein the electrical connector further comprises a plurality of second conductive terminals, and each second conductive terminal comprises a second mating portion protruding into the second slot.

3. The electrical connector according to claim 2, wherein the metal shell further comprises a second receiving cavity enclosed by the top wall, the partition wall and the two side walls, the second receiving cavity is adapted to receive a second mating plug, and the second mating protrusion communicates with the second receiving cavity.

4. The electrical connector according to claim 3, wherein the metal shell comprises a second stop portion protruding into the second receiving cavity and the second stop portion is adapted to stop further insertion of the second mating plug.

5. The electrical connector according to claim 4, wherein the second stop portion comprises a stop piece integrally bent downwardly from the top wall.

6. The electrical connector according to claim 1, wherein the first stop portion comprises a stop protrusion fixed to the first mating protrusion and protruding into the first receiving cavity.

7. The electrical connector according to claim 6, wherein the stop protrusion is made separately from the first mating protrusion, and the stop protrusion is installed to the first mating protrusion.

8. The electrical connector according to claim 6, wherein the stop protrusion and the first mating protrusion are integrally formed.

9. The electrical connector according to claim 1, wherein the first stop portion comprises a stop block located at a rear end of the first slot and exposed forwardly to the first slot.

10. The electrical connector according to claim 9, further comprising a first terminal module and a second terminal module, the first conductive terminals comprising an upper first conductive terminal and a lower first conductive terminal, the first mating portions of the first conductive terminals comprising an upper first mating portion and a lower first mating portion, the first terminal module comprising a first insulating block and the upper first conductive terminal fixed to the first insulating block; the second terminal module comprising a second insulating block and the lower first conductive terminal fixed to the second insulating block, the upper first conductive terminal comprising a first elastic arm protruding into the first slot, the upper first mating portion being provided on the first elastic arm, the lower first conductive terminal comprising a second elastic arm protruding into the first slot, the lower first mating portion being provided on the second elastic arm.

11. The electrical connector according to claim 10, wherein the first insulating block and the second insulating block are at least in contact with each other.

12. The electrical connector according to claim 11, wherein the stop block abuts against the first insulating block and/or the second insulating block.

13. The electrical connector according to claim 9, wherein the stop block is made separately from the insulating body, and the stop block is installed in the first slot.

14. The electrical connector according to claim 13, wherein the stop block comprises an inclined guide portion to facilitate insertion of the stop block into the first slot.

15. The electrical connector according to claim 13, wherein the stop block comprises a stop surface exposed forwardly in the first slot, and the stop surface is a vertical surface.

16. A stacked electrical connector, comprising:

an insulating body, the insulating body comprising a first mating protrusion and a second mating protrusion disposed above the first mating protrusion, the first mating protrusion comprising a first mating surface and a first slot extending through the first mating surface, the second mating protrusion comprising a second mating surface and a second slot extending through the second mating surface, the second mating protrusion being in parallel to the first mating protrusion;

a plurality of first conductive terminals, each first conductive terminal comprising a first mating portion protruding into the first slot;

a plurality of second conductive terminals, each second conductive terminal comprising a second mating portion protruding into the second slot;

a metal shell, the metal shell being assembled to the insulating body along a horizontal direction, the metal shell comprising a top wall, a bottom wall, two side walls connecting the top wall and the bottom wall, and a partition wall located between the top wall and the bottom wall; the metal shell defining a first receiving cavity and a second receiving cavity; the first receiving cavity being at least enclosed by the bottom wall, the partition wall and the two side walls, the second receiving cavity being at least enclosed by the top wall, the partition wall and the two side walls; the first receiving cavity being adapted to receive a first mating plug, the second receiving cavity being adapted to receive a second mating plug;

wherein the metal shell further comprises an installation opening extending downwardly through the partition wall and the bottom wall, the insulating body is received in the metal shell through the installation opening along a vertical direction;

wherein the electrical connector comprises a first stop portion provided on the first mating protrusion, and the first stop portion is adapted to stop further insertion of the first mating plug along the horizontal direction; and wherein the metal shell comprises a second stop portion protruding into the second receiving cavity, and the second stop portion is adapted to stop further insertion of the second mating plug along the horizontal direction.

17. The stacked electrical connector according to claim 16, wherein the first stop portion comprises a stop protrusion fixed to the first mating protrusion and protruding into the first receiving cavity.

18. The stacked electrical connector according to claim 16, wherein the second stop portion comprises a stop piece integrally bent downwardly from the top wall.

19. The stacked electrical connector according to claim 16, wherein the first stop portion comprises a stop block located at a rear end of the first slot and exposed forwardly to the first slot.

20. The stacked electrical connector according to claim 19, wherein the stop block is made separately from the insulating body, and the stop block is installed in the first slot.

* * * * *